(12) United States Patent
Kuo et al.

(10) Patent No.: US 10,957,233 B1
(45) Date of Patent: Mar. 23, 2021

(54) CONTROL METHOD FOR DISPLAY PANEL

(71) Applicant: NOVATEK Microelectronics Corp., Hsinchu (TW)

(72) Inventors: Te-Hsien Kuo, Keelung (TW); Chin-Hung Hsu, Taoyuan (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 16/720,005

(22) Filed: Dec. 19, 2019

(51) Int. Cl.
*G09G 3/36* (2006.01)
*G09G 3/20* (2006.01)
*H04N 7/01* (2006.01)

(52) U.S. Cl.
CPC ....... *G09G 3/20* (2013.01); *G09G 2310/0267* (2013.01); *G09G 2310/0275* (2013.01); *G09G 2310/08* (2013.01); *G09G 2320/041* (2013.01); *H04N 7/01* (2013.01)

(58) Field of Classification Search
CPC .......... G09G 3/20; G09G 3/36; G09G 5/005; G09G 5/391; G09G 2300/0814; G09G 2310/0218; G09G 2310/0267; G09G 2310/0275; G09G 2310/08; G09G 2320/041; G09G 2330/021; G09G 2340/16; G09G 2330/02; G09G 2340/0435; H04N 7/01
See application file for complete search history.

(56) References Cited

U.S. PATENT DOCUMENTS

| | | | | |
|---|---|---|---|---|
| 5,844,540 A | * | 12/1998 | Terasaki | G09G 3/3406 345/102 |
| 6,633,274 B1 | * | 10/2003 | Yokota | G09G 3/36 345/100 |
| 2002/0008688 A1 | * | 1/2002 | Yamamoto | G09G 3/3648 345/98 |
| 2003/0006953 A1 | * | 1/2003 | Yang | G09G 3/3677 345/90 |
| 2003/0062844 A1 | * | 4/2003 | Miyazawa | G09G 3/3241 315/169.3 |
| 2003/0142047 A1 | * | 7/2003 | Inoue | G09G 3/3233 345/82 |
| 2004/0130545 A1 | * | 7/2004 | Ishizuka | G09G 3/3233 345/212 |
| 2005/0030264 A1 | * | 2/2005 | Tsuge | G09G 3/325 345/76 |
| 2005/0093791 A1 | * | 5/2005 | Lo | G09G 3/3233 345/82 |

(Continued)

*Primary Examiner* — Michael J Eurice
(74) *Attorney, Agent, or Firm* — CKC & Partners Co., LLC

(57) ABSTRACT

A control method, suitable for a display panel including M scan lines and a plurality of source lines, include following operations. M is a positive integer. M gate signals are generated sequentially in M time periods during a first display frame to the M scan lines of the display panel. A level of a data signal to one of the source lines is updated in the M time periods during the first display frame. N gate signals are generated in N time periods selected from the M time periods during a second display frame to N scan lines selected from the M scan lines. (M-N) gate signals are suspended during the second display frame. The level of the data signal is updated in the N time periods and is not updated in the (M-N) time periods during the second display frame. N is a positive integer smaller than M.

15 Claims, 15 Drawing Sheets

(56) References Cited

U.S. PATENT DOCUMENTS

| | | | |
|---|---|---|---|
| 2005/0116967 A1* | 6/2005 | Shirasaki | G09G 3/325 345/690 |
| 2005/0122305 A1* | 6/2005 | Murao | G02F 1/133382 345/101 |
| 2005/0168491 A1* | 8/2005 | Takahara | G09G 3/3241 345/690 |
| 2006/0284904 A1* | 12/2006 | Ng | G09G 3/3611 345/691 |
| 2007/0164946 A1* | 7/2007 | Akutsu | G09G 3/36 345/87 |
| 2007/0216671 A1* | 9/2007 | Oku | G09G 3/367 345/211 |
| 2008/0158212 A1* | 7/2008 | Maruyama | G09G 3/2025 345/208 |
| 2008/0238901 A1* | 10/2008 | Taneda | G09G 3/3233 345/204 |
| 2008/0284768 A1* | 11/2008 | Yoshida | G09G 3/2025 345/208 |
| 2009/0179832 A1* | 7/2009 | Kohno | G09G 3/3233 345/76 |
| 2010/0118016 A1* | 5/2010 | Fujimura | G09G 3/3655 345/211 |
| 2011/0175895 A1* | 7/2011 | Hayakawa | G09G 3/3655 345/212 |
| 2014/0092301 A1* | 4/2014 | Kumakura | H04N 21/4788 348/441 |
| 2014/0092302 A1* | 4/2014 | Kumakura | H04N 21/631 348/441 |
| 2015/0186098 A1* | 7/2015 | Hall | H01H 11/04 345/1.3 |
| 2016/0351097 A1* | 12/2016 | Sato | G09G 3/344 |
| 2018/0357975 A1* | 12/2018 | Sone | G09G 3/3688 |
| 2019/0035333 A1* | 1/2019 | Chen | G09G 3/3225 |

* cited by examiner

CONTROL METHOD FOR DISPLAY PANEL

BACKGROUND

Field of Invention

The disclosure relates to a control method for a display panel. More particularly, the disclosure relates to the control method for dynamically adjusting gate signals and data signals in the display panel.

Description of Related Art

In a display panel, sub-pixels of the display panel are usually controlled by gate signals and data signals. Gate signals are utilized to turn on switches within the sub-pixels. When the switches are turned on, the data signals are utilized to set up brightness levels on the corresponding the sub-pixels. Therefore, the display panel is able to display according to display data.

In order to display certain display data, the data signals are required to be toggled back and forth between two different levels at a high frequency (e.g., toggling 1024, 2048 or 4096 times in one frame). In this case, the source driver may consume a lot of power in order to generate aforesaid data signals. In addition, a temperature around the source driver will raise when the source driver generates these data signals.

SUMMARY

The disclosure provides a control method, which is suitable for a display panel includes M scan lines and a plurality of source lines. M is a positive integer. The control method includes following operations. M gate signals are generated sequentially in M time periods during a first display frame to the M scan lines of the display panel. A level of a data signal to one of the source lines is updated in the M time periods during the first display frame. N gate signals are generated in N time periods selected from the M time periods during a second display frame to N scan lines selected from the M scan lines. N is a positive integer smaller than M. (M-N) gate signals selected from the M gate signals in (M-N) time periods are suspended during the second display frame. The level of the data signal is updated in the N time periods during the second display frame The level of the data signal is kept as a latest updated level or a high impedance state in the (M-N) time periods during the second display frame.

The disclosure further provides a control method, which is suitable for a display panel including M scan lines and a plurality of source lines. M is a positive integer. The control method include following operations. A pattern of display data to be displayed on the display panel is detected. Whether to drive the display panel in a normal toggling mode or a low toggling mode is determined according to the pattern of the display data. In response to the normal toggling mode, M gate signals are generated sequentially in M time periods during all display frames to the M scan lines of the display panel, and a level of a data signal to one of the source lines is updated in the M time periods during the first display frame, M is a positive integer. In response to the low toggling mode, N gate signals are generated in N time periods during at least one of successive display frames to N scan lines selected from the M scan lines, (M-N) gate signals selected from the M gate signals are suspended in (M-N) time periods during the second display frame, the level of the data signal is updated in the N time periods during the second display frame, and the level of the data signal is kept as a latest updated level or a high impedance state in the (M-N) time periods during the second display frame, N is a positive integer smaller than M.

The disclosure further provides a control method, which is suitable for a display panel including M scan lines and a plurality of source lines. M is a positive integer. The control method include following operations. A temperature reading is sensed around the display panel. Whether to drive the display panel in a normal toggling mode or a low toggling mode is determined according to the temperature reading in reference with a temperature threshold. In response to the normal toggling mode, M gate signals are generated sequentially in M time periods during all display frames to the M scan lines of the display panel, and a level of a data signal to one of the source lines is updated in the M time periods during the first display frame, M is a positive integer. In response to the low toggling mode, N gate signals are generated in N time periods during at least one of successive display frames to N scan lines selected from the M scan lines, (M-N) gate signals selected from the M gate signals are suspended in (M-N) time periods during the second display frame, the level of the data signal is updated in the N time periods during the second display frame, and the level of the data signal is kept as a latest updated level or a high impedance state in the (M-N) time periods during the second display frame, N is a positive integer smaller than M.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
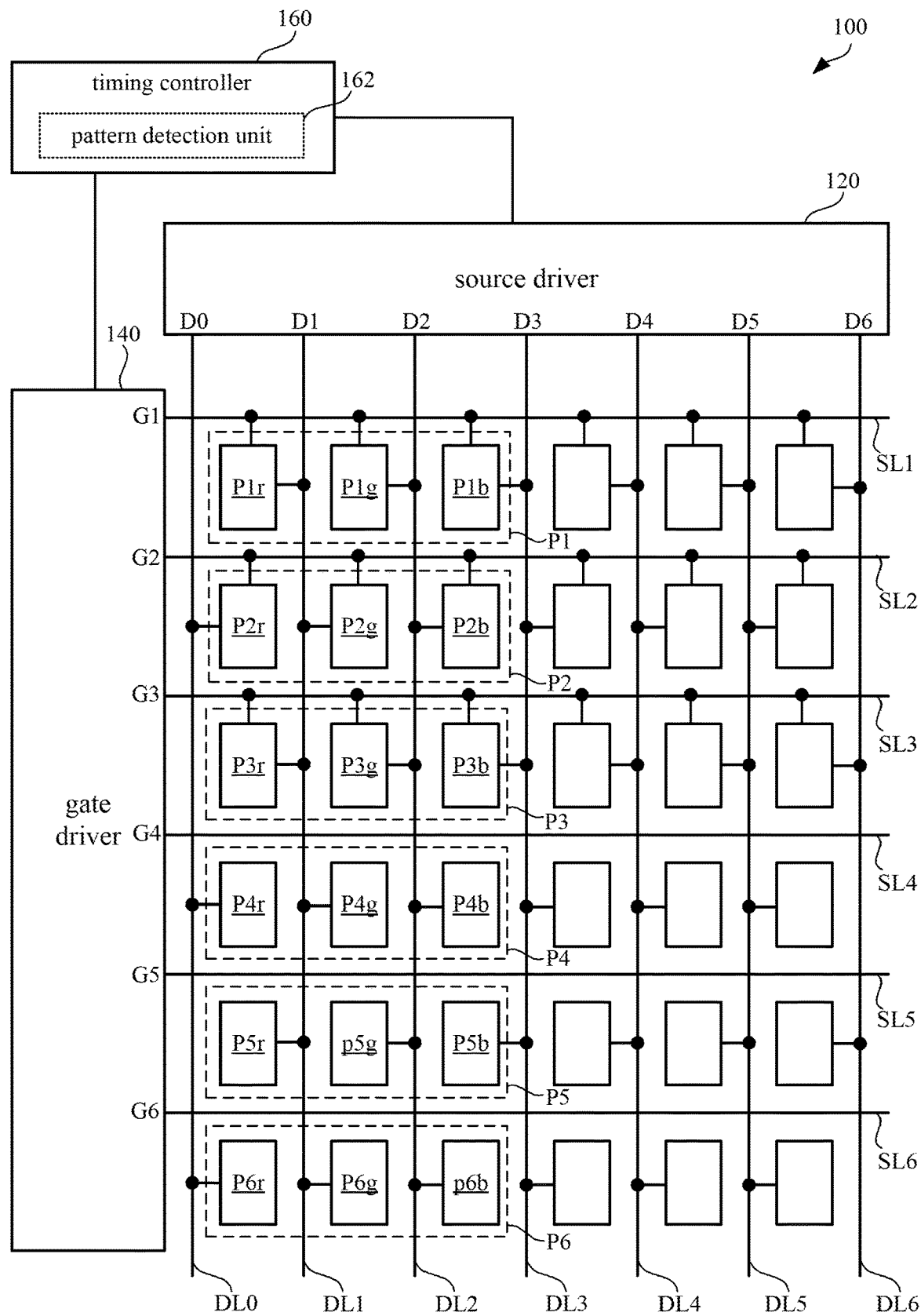
FIG. 1 is a schematic diagram illustrating a display panel according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a display panel 100 according to an embodiment of this disclosure. The display panel 100 includes multiple pixels arranged in an array (e.g., pixels P1, P2, P3, P4, P5 and P6 are labelled in FIG. 1 for demonstration), and the disclosure is not limited thereto. In practical applications, the display panel 100 may include more pixels, e.g., 1024×768 pixels, 1920×1080 pixels, 2048×1556, 4096×2160 pixels or different amounts of pixels. Each of the pixels P1-P6 includes multiple sub-pixels. For example, the pixel P1 includes a sub-pixel P1r for displaying a red color, another sub-pixel P1g for displaying a green color, and another sub-pixel P1b for displaying a blue color. Similarly, the pixel P2 includes a sub-pixel P2r, another sub-pixel P2g and another sub-pixel P2b. The pixel P3 includes a sub-pixel P3r, another sub-pixel P3g, and another sub-pixel P3b. The pixel P4 includes a sub-pixel P4r, another sub-pixel P4g and another sub-pixel P4b. The pixel P5 includes a sub-pixel P5r, another sub-pixel P5g and another sub-pixel P5b. The pixel P6 includes a sub-pixel P6r, another sub-pixel P6g and another sub-pixel P6b.

As shown in FIG. 1, the display panel 100 includes a source driver 120, a gate circuit 140 and a timing controller (TCON) 160.

The source driver circuit 120 is utilized to generate data signals D0-D6. The data signals D0-D6 are utilized drive sub-pixels in the display panel 100 with various colors through data lines DL0-DL6. For example, the data signal D1 is utilized to charges pixel capacitors of the sub-pixels P1r, P2g, P3r, P4g, P5r and P6g. The data signal D2 is utilized to charges pixel capacitors of the sub-pixels P1g, P2b, P3g, P4b, P5g and P6b.

In the embodiment illustrated in FIG. 1, the sub-pixels P1r, P2g, P3r, P4g, P5r and P6g are connected to the data signal D1 in a zig-zag way, and the sub-pixels P1r, P2g, P3r, P4g, P5r and P6g are connected to the data signal D2 in the zig-zag way. However, the disclosure is not limited thereto. In some other embodiments, the sub-pixels P1r, P2r, P3r, P4r, P5r and P6r can be connected to one data signal (not shown in FIG. 1); the sub-pixels P1g, P2g, P3g, P4g, P5g and P6g can be connected to another data signal (not shown in FIG. 1); and, the sub-pixels P1b, P2b, P3b, P4b, P5b and P6b can be connected to still another data signal (not shown in FIG. 1).

The gate driver 140 is utilized to generate gate signals G1-G6. The gate signals G1-G6 are transmitted through scan lines SL1-SL6 for turning on/off pixel-switches (not shown in FIG. 1) within the sub-pixels P1r~P6b. For example, the gate signal G1 is utilized to turn on/off pixel-switches in P1r, P1g and P1b. The gate signal G2 is utilized to turn on/off pixel-switches in P2r, P2g and P2b. The gate signal G3 is utilized to turn on/off pixel-switches in P3r, P3g and P3b. The gate signal G4 is utilized to turn on/off pixel-switches in P4r, P4g and P4b. The gate signal G5 is utilized to turn on/off pixel-switches in P5r, P5g and P5b. The gate signal G6 is utilized to turn on/off pixel-switches in P6r, P6g and P6b.

The timing controller (TCON) 160 is coupled to the source driver 120 and the gate driver 140. The timing controller (TCON) 160 is used to generate some timing control signals, which are utilized to control behaviors of the source driver 120 (e.g., enable/disable the generation of the data signals D0-D6, or when to generate the data signals D0-D6) and also behaviors of the gate driver 140 (e.g., enable/disable the generation of the gate signals G1-G6, or when to generate the gate signals G1-G6).

As shown in FIG. 1, the timing controller 160 in this embodiment includes a pattern detection unit 162. The pattern detection unit 162 is utilized to detect a pattern of display data to be displayed on the display panel 100, and to determine whether the pattern of the display data is a heavy loading pattern or not. Further details or definition of the heavy loading pattern will be explained in following paragraphs. In order to display the display data with the heavy loading pattern, the data signals D0-D6 generated by the source driver 120 are required to toggle between two different levels, which are far from each other. For example, the data signals D0-D6 may be required to toggle several times between a first voltage level V1 and a second voltage level V2 in one display frame. In some embodiment, the first voltage level V1 can be a high system voltage VDD (configured at about 18V for example), and the second voltage level V2 can be a low system voltage VSS (configured at about 0V for example). To achieve this toggling of the data signals D0-D6, the source driver 120 will consume a lot of power and generate heats. The heats will cause the source driver 120 and the display panel 100 unstable.

Figure 2:
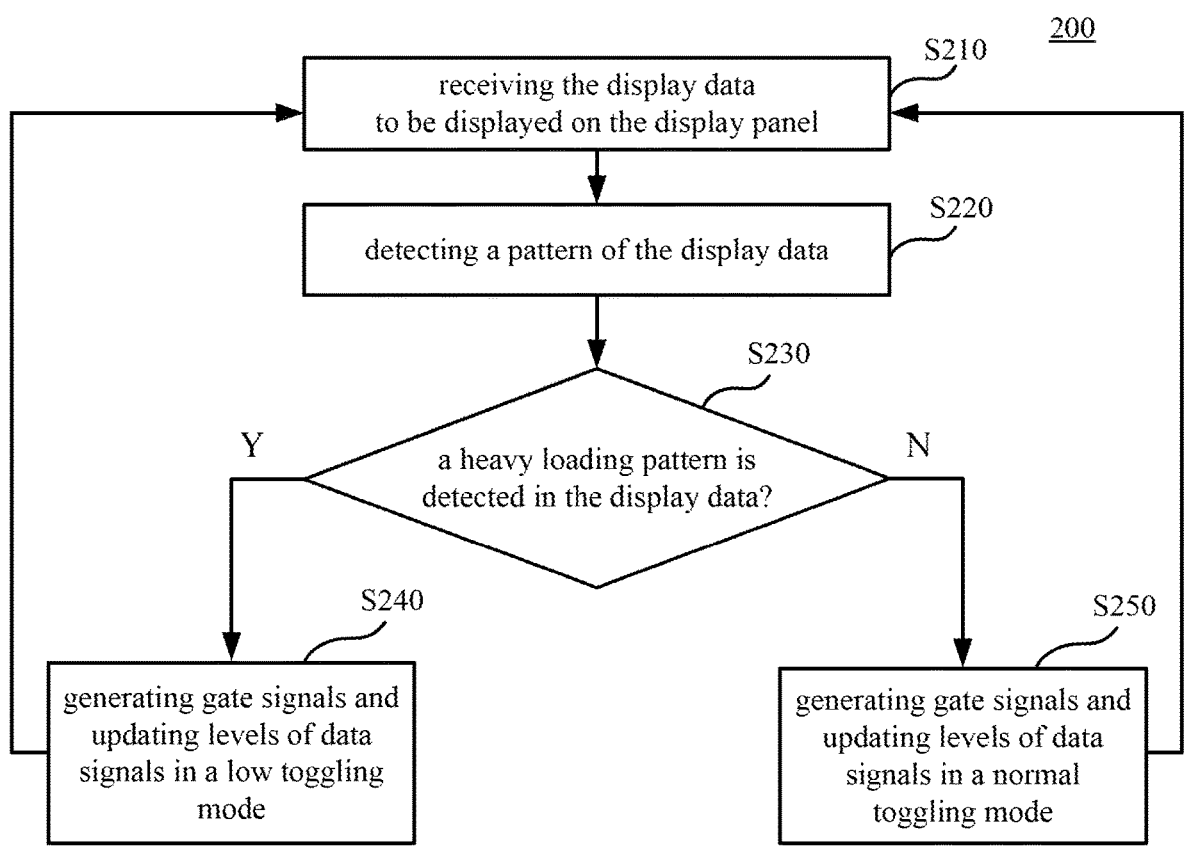
FIG. 2 is a flow diagram illustrating a control method in some embodiments of the disclosure.

Therefore, the display panel 100 in some embodiments adopts different manners to process the display data with the heavy loading pattern and other display data without the heavy loading pattern. Reference is further made to FIG. 2, which is a flow diagram illustrating a control method 200 in some embodiments of the disclosure. As shown in FIG. 2, operation S210 is performed, by the timing controller 160, for receiving the display data to be displayed on the display panel 100. Operation S220 is performed, by the pattern detection unit 162 of the timing controller 160, for detecting a pattern of the display data. Operation S230 is performed, by the pattern detection unit 162 of the timing controller 160, for determining whether the pattern of the display data is a heavy loading pattern or not.

Figure 3A:
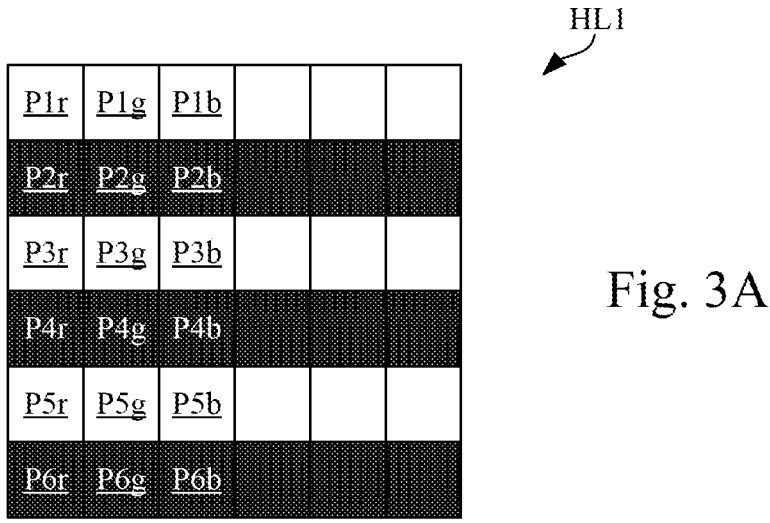
FIG. 3A, FIG. 3B and FIG. 3C are schematic diagrams illustrating display data with different heavy loading patterns in some embodiments.
Figure 3B:
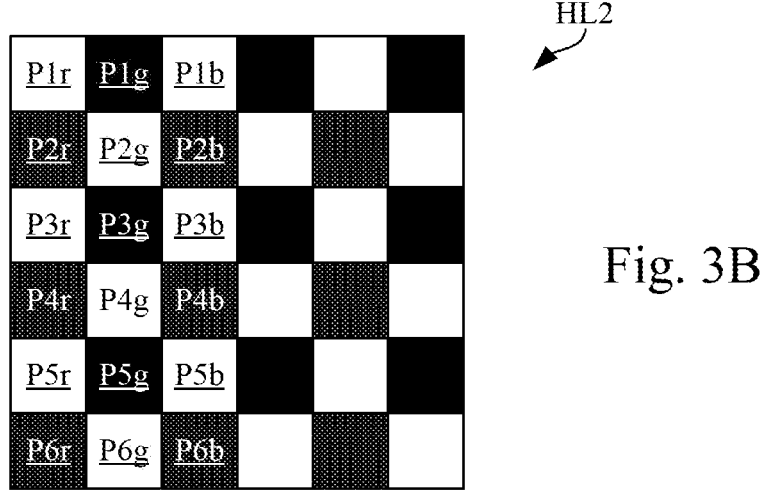
Figure 3C:
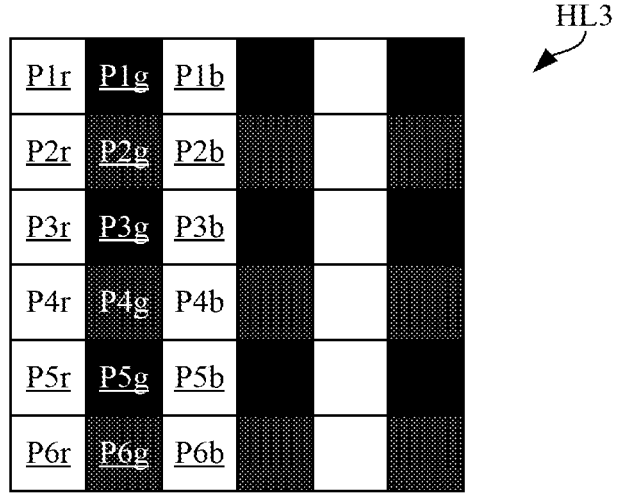

Reference is further made to FIG. 3A, FIG. 3B and FIG. 3C. FIG. 3A, FIG. 3B and FIG. 3C are schematic diagrams illustrating display data with different heavy loading patterns HL1, HL2 and HL3 in some embodiments.

The heavy loading patterns HL1 shown in FIG. 3A is a horizontal stripe pattern. In FIG. 3A, the sub-pixels on the first line, the third line and the fifth line are configured to display white. The sub-pixels on the second line, the fourth line and the sixth line are configured to display black.

The heavy loading patterns HL2 shown in FIG. 3B is a chess pattern. In FIG. 3B, the sub-pixel P2g is configured to display white, and all sub-pixels (P1g, P2r, P2b and P3g) next to the sub-pixel P2g are configured to display black.

The heavy loading patterns HL3 shown in FIG. 3C is a vertical stripe pattern. In FIG. 3C, the sub-pixels on the first column, the third column and the fifth column are configured to display white. The sub-pixels on the second column, the fourth column and the sixth column are configured to display black.

When the display panel 100 is utilized to display the heavy loading patterns HL1, HL2 and HL3 illustrated in FIG. 3A-FIG. 3C, the data signals D0-D6 may be required to toggle between the first voltage level V1 and the second voltage level V2, which are far from each other. However, the heavy loading pattern mentioned in this disclosure is not limited to the embodiments shown in FIG. 3A-FIG. 3C, and it also covers any equivalent pattern causing the data signals D0-D6 to toggle between the first voltage level V1 and the second voltage level V2.

When the pattern of the display data is detected to be the heavy loading pattern in S230, operation S240 is performed to generate the gate signals G1-G6 and updating levels of the data signals D0-D6 in a low toggling mode.

On the other hand, when the pattern of the display data is not the heavy loading pattern, operation S250 is performed to generate the gate signals G1-G6 and updating levels of the data signals D0-D6 in a normal toggling mode.

Figure 4:
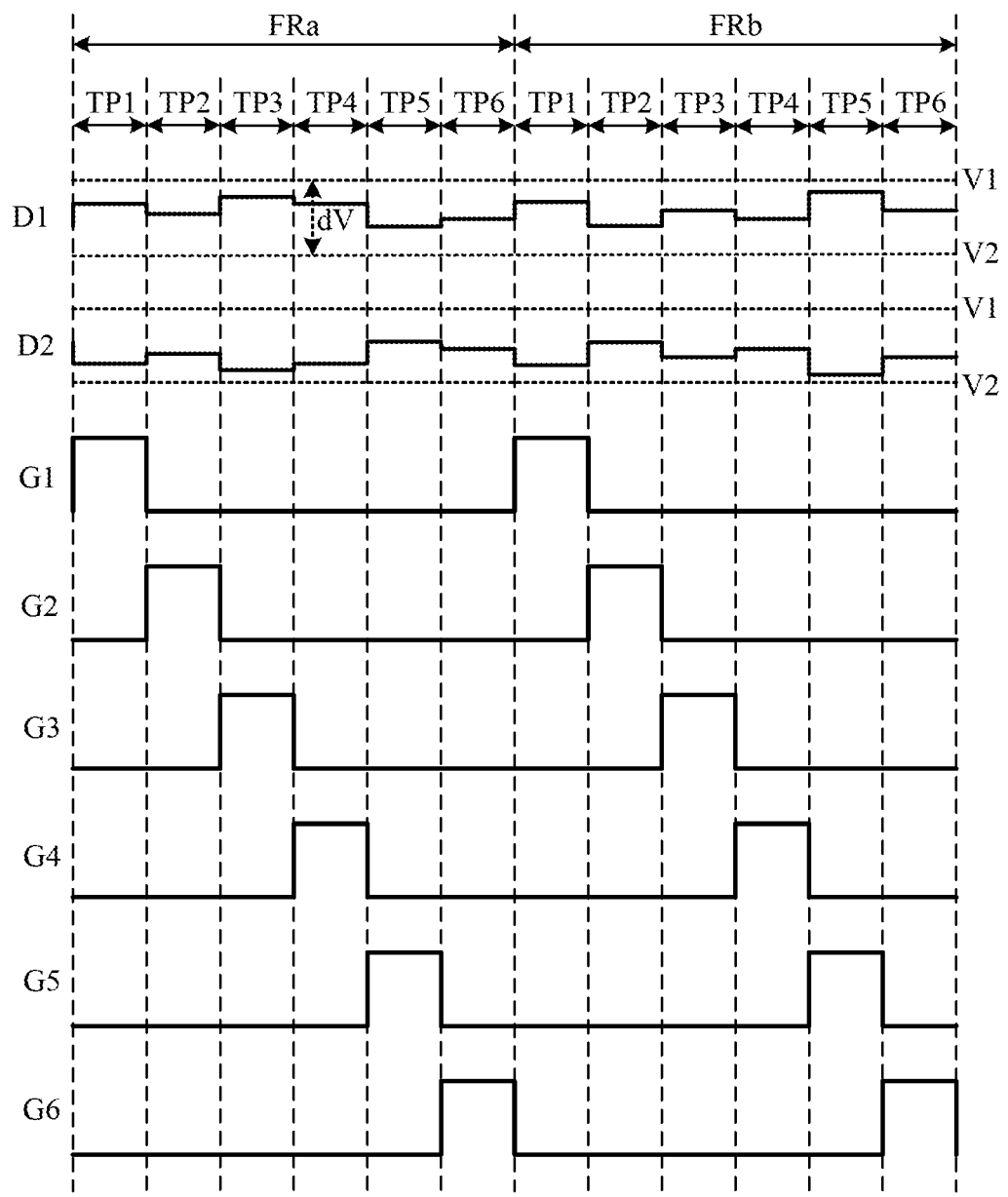
FIG. 4 is a signal waveform diagram illustrating the data signals and the gate signals in the normal toggling mode when the display data is not the heavy loading pattern.

Reference is further made to FIG. 4, which is a signal waveform diagram illustrating the data signals D1-D2 and the gate signals G1-G6 in the normal toggling mode when the display data is not the heavy loading pattern.

As shown in FIG. 4, when the display data is not the heavy loading pattern, the data signal D1 is toggled from one level to another level for six times in six time periods TP1-TP6 of the frame FRa. The pulse of the gate signal G1 is generated in the time period TP1 in each of the frames FRa and FRb. The pulse of the gate signal G2 is generated in the time period TP2 in each of the frames FRa and FRb. The pulse of the gate signal G3 is generated in the time period TP3 in each of the frames FRa and FRb.

FIG. 4 illustrates a demonstrational example (each display frame has six time periods TP1-TP6) corresponding to the embodiment shown in FIG. 1 (the display panel 100 includes six scan lines SL1-SL6 and six gate signals G1-G6). When there are M scan lines and M gate signals, each display frame will have M time periods. M is a positive integer. In practical applications, M is decided by a resolution of the display panel 100.

As shown in FIG. 4, when the display data is not the heavy loading pattern, the data signal D1 will be updated six times in six time periods TP1-TP6 for configuring brightness levels on the sub-pixels P1r, P2g, P3r, P4g, P5r and P6g respectively. The display data (not the heavy loading pattern) may be a portrait photo, a scenery photo, a color image or a grey level image without a specific pattern. In this case, the levels of the data signal D1 will not change dramatically from the time period TP1 to the time period TP2 (or from the time period TP2 to the time period TP3). As shown in FIG. 4, a variance of the levels of the data signal D1 between two successive time periods is about 5% to about 50% of a voltage gap dV between the first voltage level V1 and the second voltage level V2.

Figure 5:
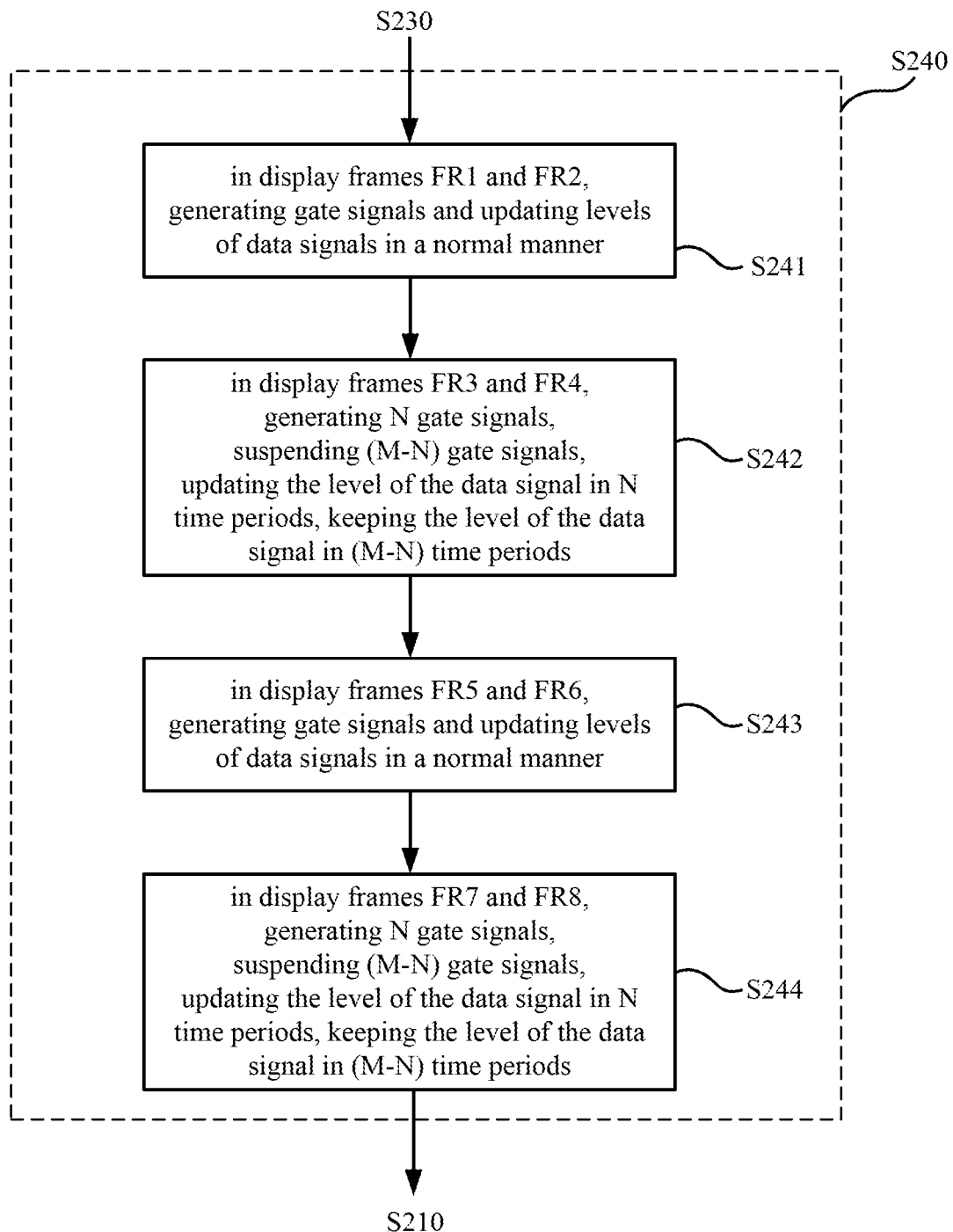
FIG. 5 is a flow diagram illustrating further operations in one operation shown in FIG. 2 according to some embodiments.

Reference is further made to FIG. 5, which is a flow diagram illustrating operations S241-S244 in the operation S240 shown in FIG. 2 according to some embodiments.

Reference is further made to FIG. 6A to FIG. 6D, which are signal waveform diagrams illustrating the data signals D1-D2 and the gate signals G1-G6 during eight successive display frames FR1-FR8 in the low toggling mode. The signal waveform shown in FIG. 6A to FIG. 6D is utilized to drive the display panel 100 to display the heavy loading patterns HL1 shown in FIG. 3A when the display panel 100 adopts a column inversion.

When the pattern of the display data is detected to be the heavy loading pattern in S230, operation S241 is performed, in the display frames FR1 and FR2, to generate the gate signals G1-G6 and update levels of the data signals D0-D6 in a normal manner.

Figure 6A:
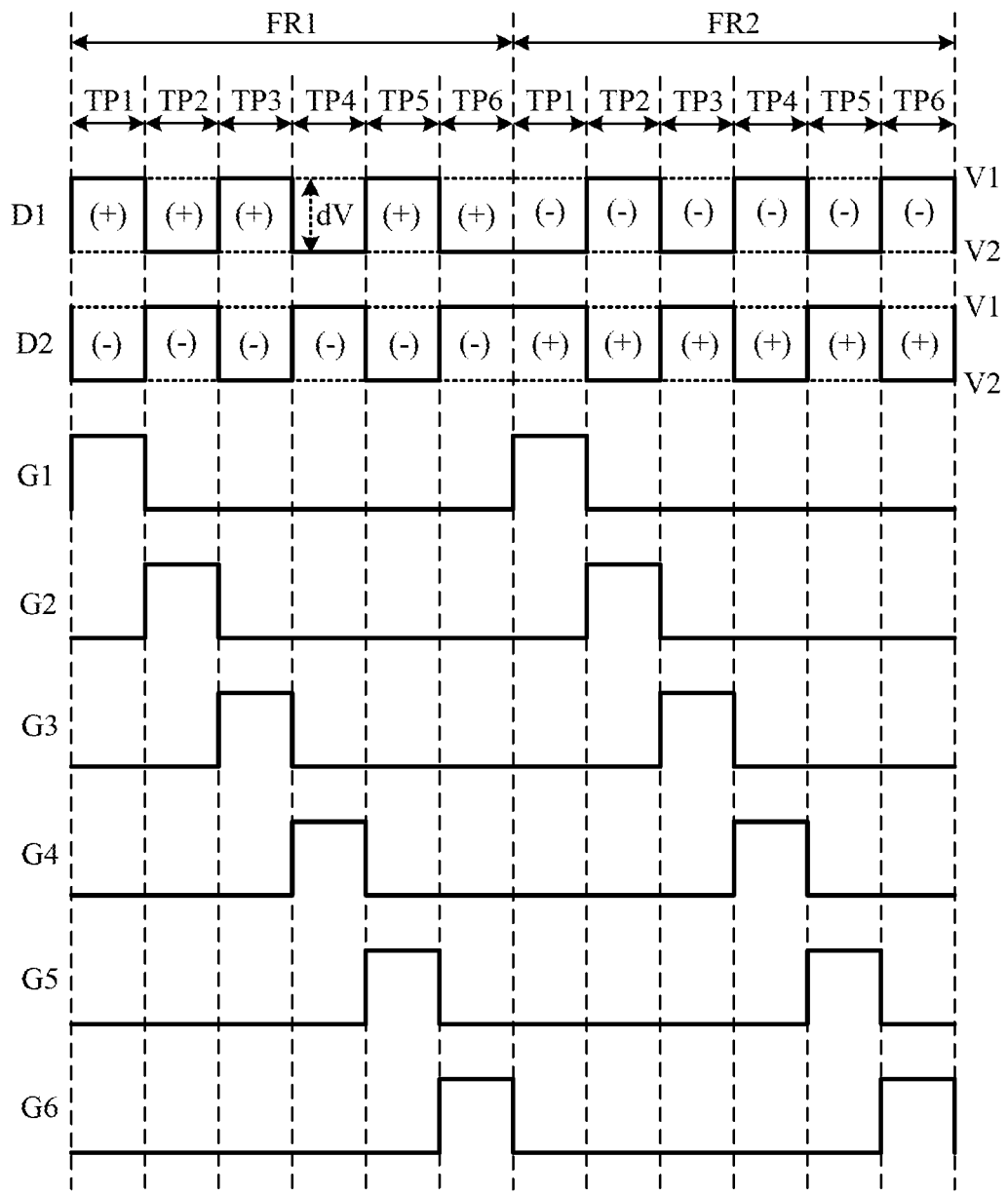
FIG. 6A to FIG. 6D are signal waveform diagrams illustrating the data signals and the gate signals during eight successive display frames in the low toggling mode.

As shown in FIG. 5 and FIG. 6A, during a time period TP1 in the display frame FR1, the source driver 120 update the level of the data signal D1 to the first voltage level V1, and the gate driver 140 generate the pulse of the gate signal G1, so as to set up the sub-pixel P1r to be bright (as shown in FIG. 3A).

As shown in FIG. 5 and FIG. 6A, during a time period TP2 in the display frame FR1, the source driver 120 update the level of the data signal D1 to the second voltage level V2, and the gate driver 140 generate the pulse of the gate signal G2, so as to set up the sub-pixel P2g to be dark (as shown in FIG. 3A).

Similarly, as shown in FIG. 5 and FIG. 6A, during time periods TP3 and TP5 in the display frame FR1, the source driver 120 update the level of the data signal D1 to the first voltage level V1, and the gate driver 140 generate the pulses of the gate signals G3 and G5, so as to set up the sub-pixels P3r and P5r to be bright (as shown in FIG. 3A).

Similarly, as shown in FIG. 5 and FIG. 6A, during time periods TP4 and TP6 in the display frame FR1, the source driver 120 update the level of the data signal D1 to the second voltage level V2, and the gate driver 140 generate the pulses of the gate signals G4 and G6, so as to set up the sub-pixels P4g and P6g to be dark (as shown in FIG. 3A).

In other words, in the display frame FR1, the level of the data signal D1 are updated 6 times in 6 time periods TP1-TP6, and six pulses are generated on the six gate signals G1-G6 (one pulse on each gate signals G1-G6).

When there are M scan lines in the display panel 100 (in this embodiment, M=6), the level of the data signal D1 are updated M times in M time periods during the display frame FR1, and M pulses are generated on the M gate signals during the display frame FR1.

The behaviors of the gate signals G1-G6 and the data D1 in the display frame FR2 is similar to the gate signals G1-G6 and the data D1 in the display frame FR1. Levels of the data signal D1 during the time periods TP1-TP6 in the display frame FR2 are opposite to the levels of the data signal D1 during the corresponding time periods TP1-TP6 in the display frame FR1 because of the column inversion between the display frame FR1 and the display frame FR2.

The behaviors of the data D2 is similar to the behaviors of the data D1. Levels of the data signal D2 are opposite to the levels of the data signal D1 because of the column inversion between the data line DL1 and the data line DL2.

Figure 6B:
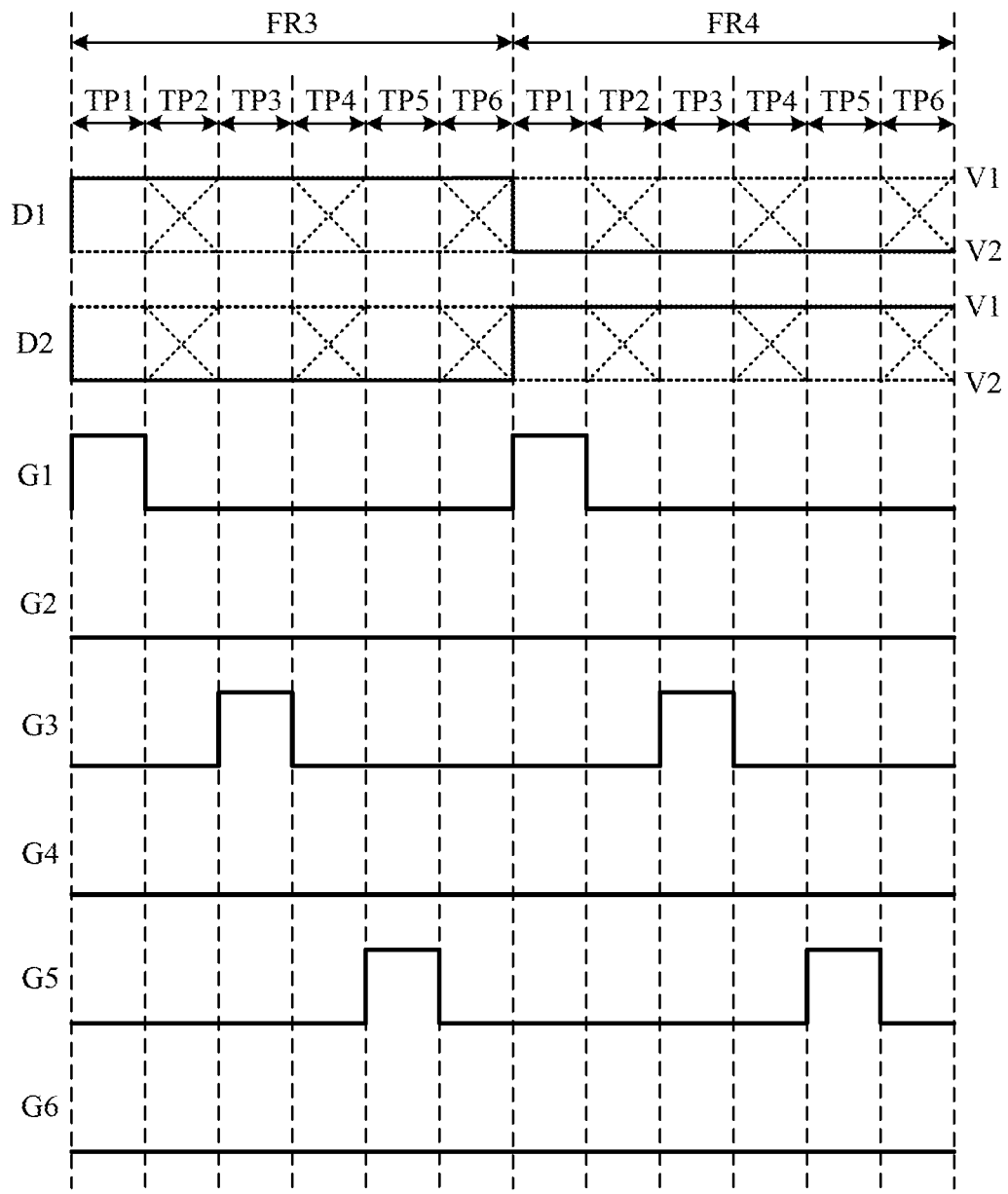

After the display frames FR1 and the display frame FR2, during following display frames FR3 and FR4 as shown in FIG. 5 and FIG. 6B, operation S242 is performed to generate pulses of N gate signals selected from the six gate signals G1-G6, suspend pulse of (M-N) gate signals, update the level of the data signal in N time periods selected from the M time periods TP1-TP6 and keep the level of the data signal as a latest updated level or a high impedance state in the (M-N) time periods during the display frames FR3 and FR4. N is a positive integer smaller than M. In the embodiment shown in FIG. 6B, M=6 and N=3.

As shown in FIG. 5 and FIG. 6B, during a time period TP1 in the display frame FR3, the source driver 120 update the level of the data signal D1 to the first voltage level V1, and the gate driver 140 generate the pulse of the gate signal G1, so as to set up the sub-pixel P1r to be bright (as shown in FIG. 3A).

As shown in FIG. 5 and FIG. 6B, during a time period TP2 in the display frame FR1, the source driver 120 does not update the level of the data signal D1, and the gate driver 140 suspends the generation the pulse of the gate signal G2. In the time period TP2, the level of the data signal D1 as a latest updated level (i.e., V1 updated in the time period TP1) or a high impedance state (Hi-Z). During the time period TP2, since the gate signal G2 has no pulse, the switch in the sub-pixel P2g will not be turned on, and the level of the data signal D1 in TP2 will not affect the sub-pixel P2g. The sub-pixel P2g will maintain the brightness updated in the latest display frame (e.g., the display frame FR2 shown in FIG. 6B).

Similarly, as shown in FIG. 5 and FIG. 6B, during time periods TP3 and TP5 in the display frame FR3, the source driver 120 update the level of the data signal D1 to the first voltage level V1, and the gate driver 140 generate the pulses of the gate signals G3 and G5, so as to set up the sub-pixels P3r and P5r to be bright (as shown in FIG. 3A).

Similarly, as shown in FIG. 5 and FIG. 6B, during time periods TP4 and TP6 in the display frame FR3, the source driver 120 does not update the level of the data signal D1, and the gate driver 140 suspends the generation the pulses of the gate signal G4 and the gate signal G6. In the time periods TP4/TP6, the level of the data signal D1 is kept as a latest updated level (i.e., V1 updated in the time period TP3/TP5) or a high impedance state (Hi-Z). During the time periods TP4/TP6, since the gate signal G4/G6 has no pulse, the switch in the sub-pixels P4g/P6g will not be turned on, and the level of the data signal D1 in TP4/TP6 will not affect the sub-pixel P4g/P6g. The sub-pixel P4g/P6g will maintain the brightness updated in the latest display frame (e.g., the display frame FR2 shown in FIG. 6A).

In other words, in the display frame FR3, the level of the data signal D1 are updated 3 times in the time periods TP1, TP3 and TP5, the level of the data signal D1 is not updated in TP2, TP4 and TP6. Pulses are generated on the gate signals G1, G3 and G5. There is no pulse generated on the gate signals G2, G4 and G6.

In the display frame FR3, the time periods TP1, TP3 and TP5 are selected in the same group because the level of the data signal D1 during the time periods TP1, TP3 and TP5 are similar (or the same). Therefore, the data signal D1 will not be toggled back and forth between two different levels.

In this embodiment, the level of the data signal D1 is kept as a constant level during the time period TP1 to the time period TP6 during the display frames FR3. Therefore, the level of the data signal D1 will not be toggled between the pull-high voltage V1 and the pull-low voltage V2 during the display frames FR3. The source driver will consume less power and induce less heat in generating the data signal D1 during the display frames FR3 (compared to the normal mode as shown in FIG. 6A).

When there are M scan lines in the display panel 100 (in this embodiment, M=6 and N=3), the level of the data signal D1 are updated N times in N time periods selected from M time periods during the display frame FR3, and N pulses are generated on the N gate signals selected from M gate signals during the display frame FR3.

The behaviors of the gate signals G1-G6 and the data D1 in the display frame FR4 is similar to the gate signals G1-G6 and the data D1 in the display frame FR3. Levels of the data signal D1 during the time periods TP1-TP6 in the display frame FR4 are opposite to the levels of the data signal D1 during the corresponding time periods TP1-TP6 in the display frame FR1 because of the column inversion between the display frame FR3 and the display frame FR4.

Figure 6C:
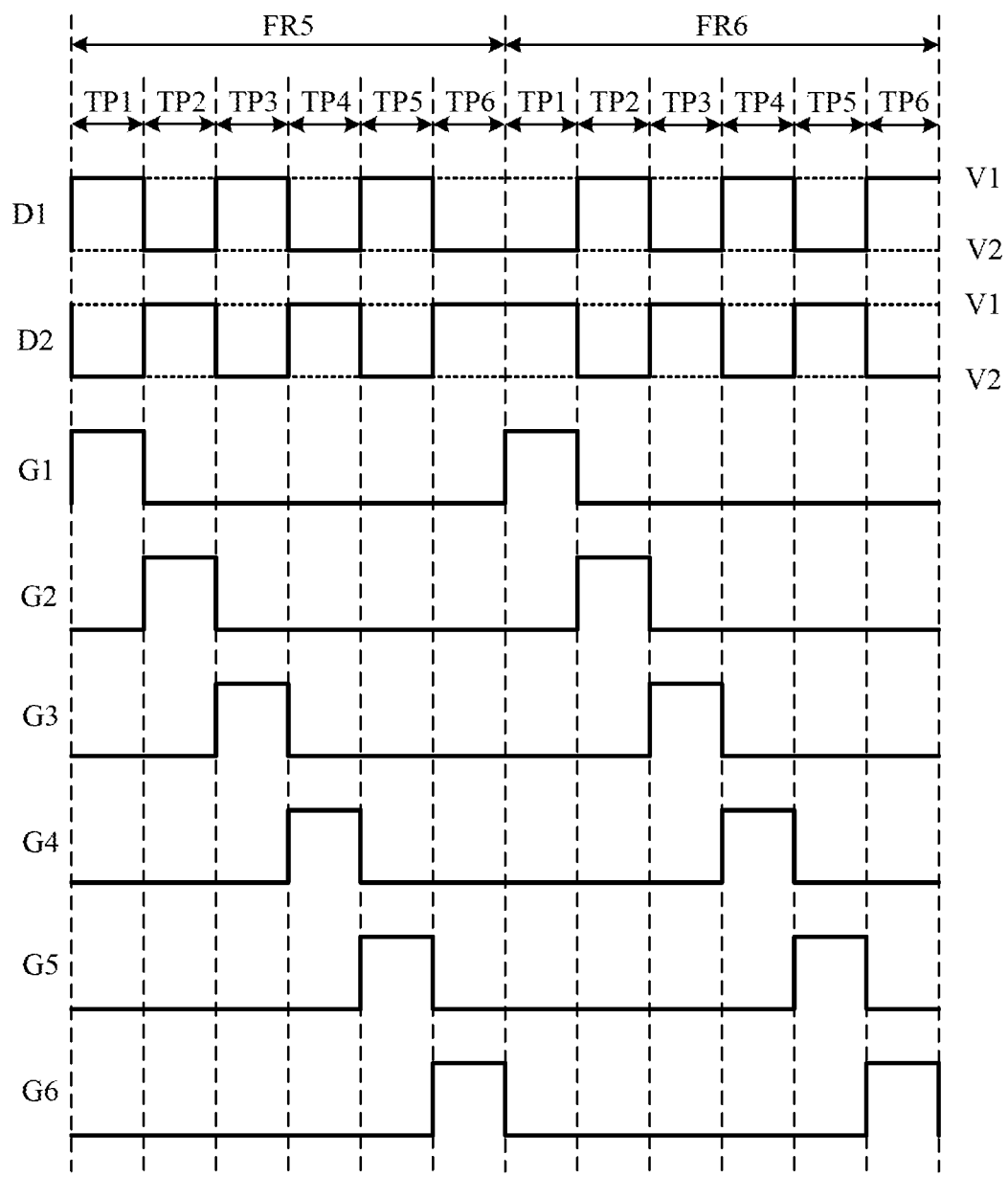

After the display frames FR3 and the display frame FR4, during following display frames FR5 and FR6 as shown in FIG. 5 and FIG. 6C, operation S243 is performed to generate the gate signals G1-G6 and update levels of the data signals D0-D6 in a normal manner. In operation S243, the gate signals G1-G6 and the levels of the data signals D0-D6 are updated in the same way as the operation S241.

As shown in FIG. 6C, in each one of the display frame FR5 and the display frame FR6, the level of the data signal D1 are updated 6 times in 6 time periods TP1-TP6, and six pulses are generated on the six gate signals G1-G6 (one pulse on each gate signals G1-G6). Details about the operation S243 and waveforms in FIG. 6C can be referred to aforesaid embodiments in the operation S241 and FIG. 6A.

Figure 6D:
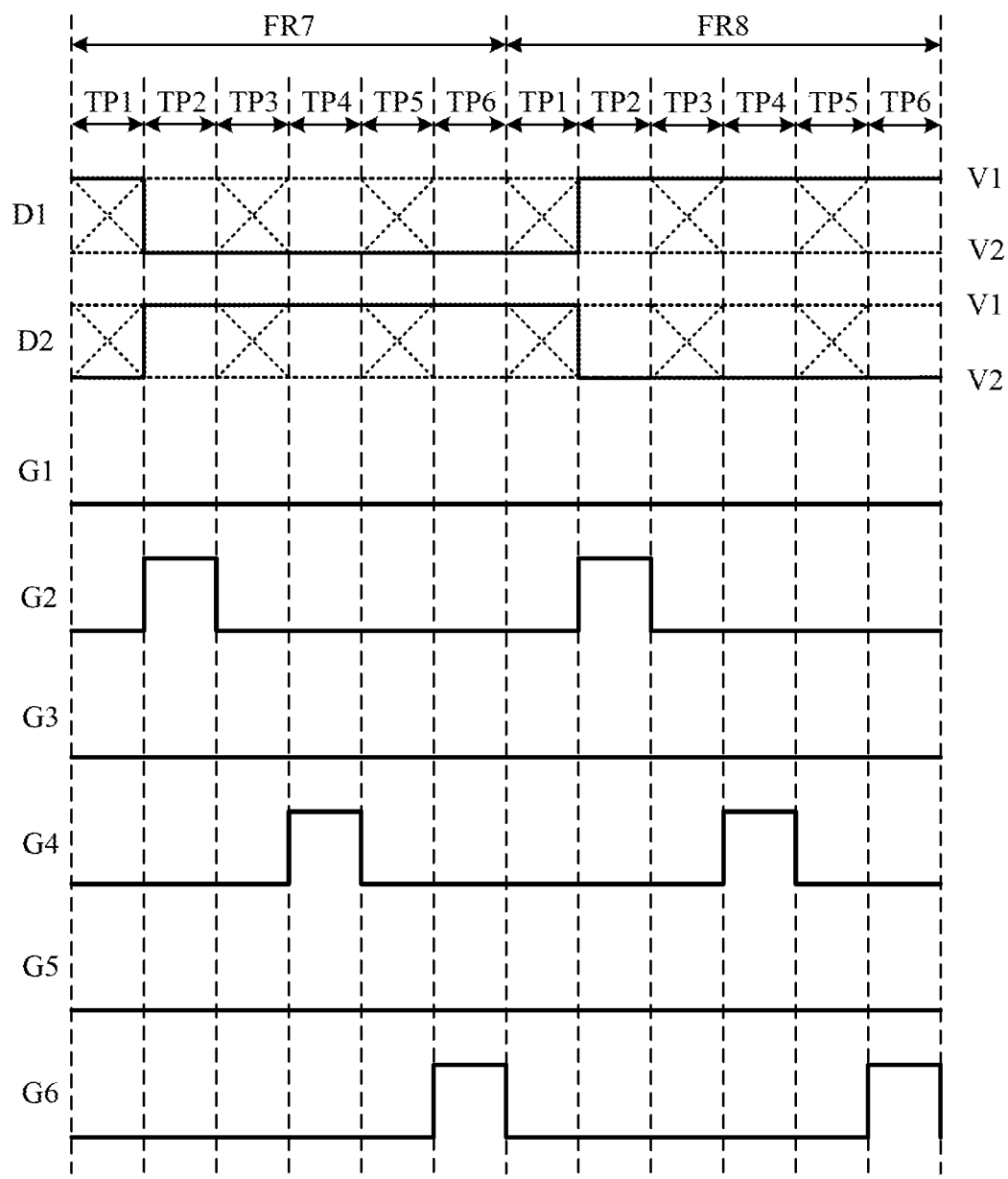

After the display frames FR5 and the display frame FR6, during following display frames FR7 and FR8 as shown in FIG. 5 and FIG. 6D, operation S244 is performed to generate pulses of (M-N) gate signals selected from the six gate signals G1-G6, suspend pulse of N gate signals, and update the level of the data signal in (M-N) time periods selected from the M time periods TP1-TP6, and keep the level of the data signal as a latest updated level or a high impedance state in the (M-N) time periods during the display frames FR7 and FR8. N is a positive integer smaller than M. In the embodiment shown in FIG. 6B, M=6 and N=3.

As shown in FIG. 5 and FIG. 6D, during the time periods TP1, TP3 and TP5 in the display frame FR7, the source driver 120 does not update the level of the data signal D1, and the gate driver 140 suspends the generation the pulses of the gate signal G1, G3 and G5, the level of the data signal D1 is kept as a latest updated level or a high impedance state in the time periods TP1, TP3 and TP5. The switches in the sub-pixels P1r, P3r and P5r will not be turned on, and the level of the data signal D1 in time periods TP1, TP3 and TP5 will not affect the sub-pixels P1r, P3r and P5r. The sub-pixels P1r, P3r and P5r will maintain the brightness updated in the latest display frame.

As shown in FIG. 5 and FIG. 6D, the source driver 120 update the level of the data signal D1 during the time periods TP2, TP4 and TP6, and the gate driver 140 generate the pulses of the gate signals G2, G4 and G6 during the time periods TP2, TP4 and TP6.

In the display frame FR7, the time periods TP2, TP4 and TP6 are selected in the same group because the level of the data signal D1 during the time periods TP2, TP4 and TP6 are similar (or the same). Therefore, the data signal D1 will not be toggled back and forth between two different levels.

In this embodiment, the level of the data signal D1 is kept as a constant level during the time period TP2 to the time period TP6 during the display frames FR5. Therefore, the level of the data signal D1 will not be toggled between the pull-high voltage V1 and the pull-low voltage V2 during the display frames FR5. The source driver will consume less power and induce less heat in generating the data signal D1 during the display frames FR5 (compared to the normal mode as shown in FIG. 6A or FIG. 6C).

FIG. 6A to FIG. 6D demonstrates waveforms of embodiments that the display panel 100 adopt a column inversion to display the heavy loading pattern HL1 when M=6 and N=3. However, the disclosure is not limited thereto.

Reference is further made to FIG. 7A to FIG. 7D, which are signal waveform diagrams illustrating the data signals D1 and the gate signals G1-G6 during eight successive display frames FR1-FR8 in the low toggling mode in another embodiment. The signal waveform shown in FIG. 7A to FIG. 7D is utilized to drive the display panel 100 to display the heavy loading patterns HL1 when M=6 and N=2. In the embodiment of FIG. 7A to FIG. 7D, the display panel 100 adopts a "1+2" line inversion, in which one line is in a positive polarity and the following two lines are in a negative polarity.

Figure 7A:
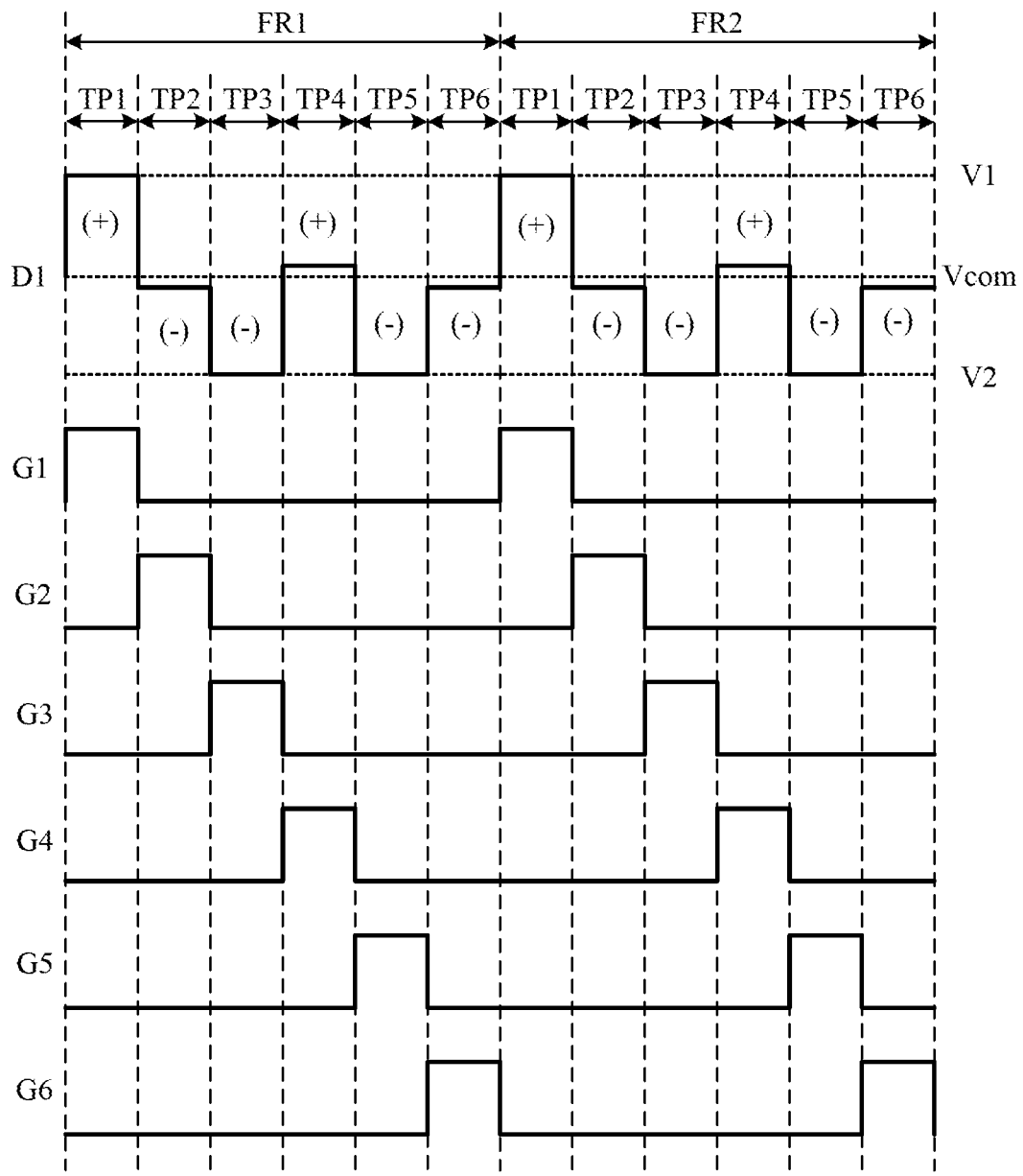
FIG. 7A to FIG. 7D are signal waveform diagrams illustrating the data signals D1 and the gate signals during eight successive display frames in the low toggling mode in another embodiment.

As shown in FIG. 5 and FIG. 7A, in the display frame FR1 (or the display frame FR2), the source driver 120 update the level of the data signal D1 six times (M times, M=6) in each of time periods TP1-TP6, and the gate driver 140 generate the pulses of the six gate signals G1-G6.

Figure 7B:
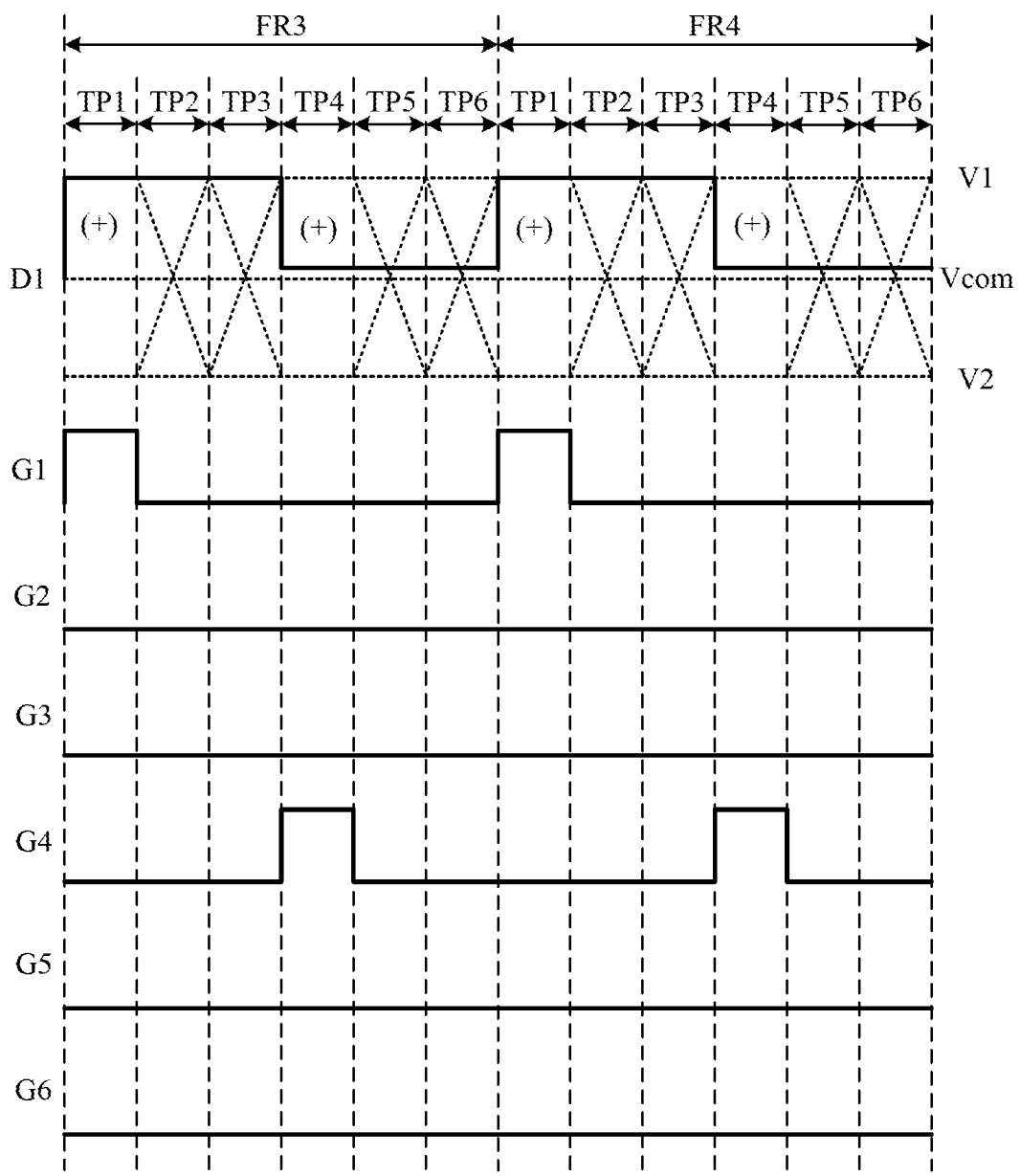

As shown in FIG. 5 and FIG. 7B, in the display frame FR3 (or the display frame FR4), the source driver 120 update the level of the data signal D1 in the time periods T1 and T4 (N times, N=2), and the gate driver 140 generate the pulses of the six gate signals G1 and G4.

As shown in FIG. 7B, the level of the data signal D1 is constant at the first voltage level V1 in successive time periods TP1-TP3 in the display frame FR3. The level of the data signal D1 is constant at the second voltage level V2 in successive time periods TP4-TP6 in the display frame FR3. Therefore, the level of the data signal D1 will not be toggled at high frequency during the display frames FR3. The source driver will consume less power and induce less heat in generating the data signal D1 during the display frames FR3 (compared to the normal mode as shown in FIG. 7A).

Figure 7C:
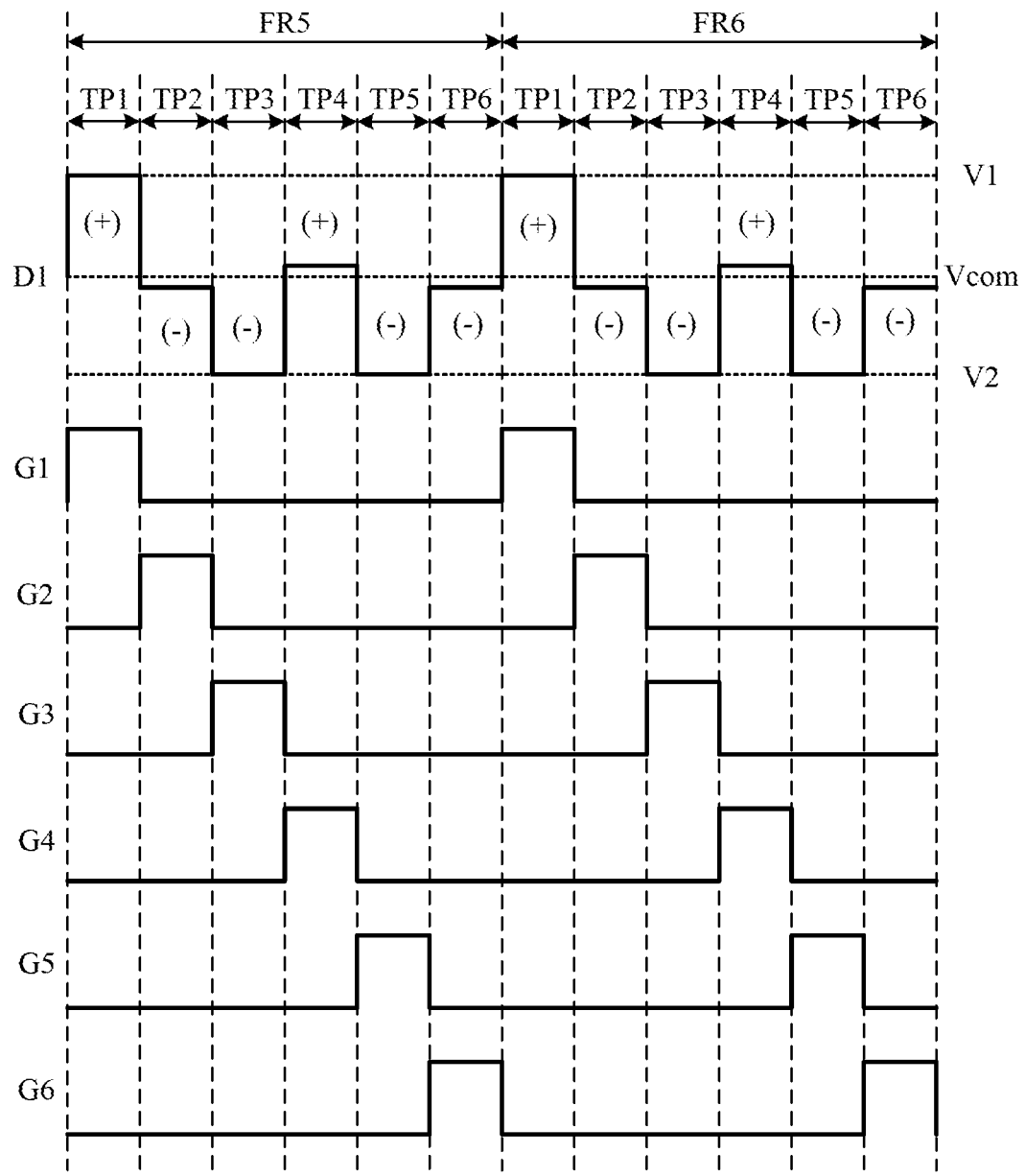

As shown in FIG. 5 and FIG. 7C, in the display frame FR5 (or the display frame FR6), the source driver 120 update the level of the data signal D1 six times (M times, M=6) in each of time periods TP1-TP6, and the gate driver 140 generate the pulses of the six gate signals G1-G6.

Figure 7D:
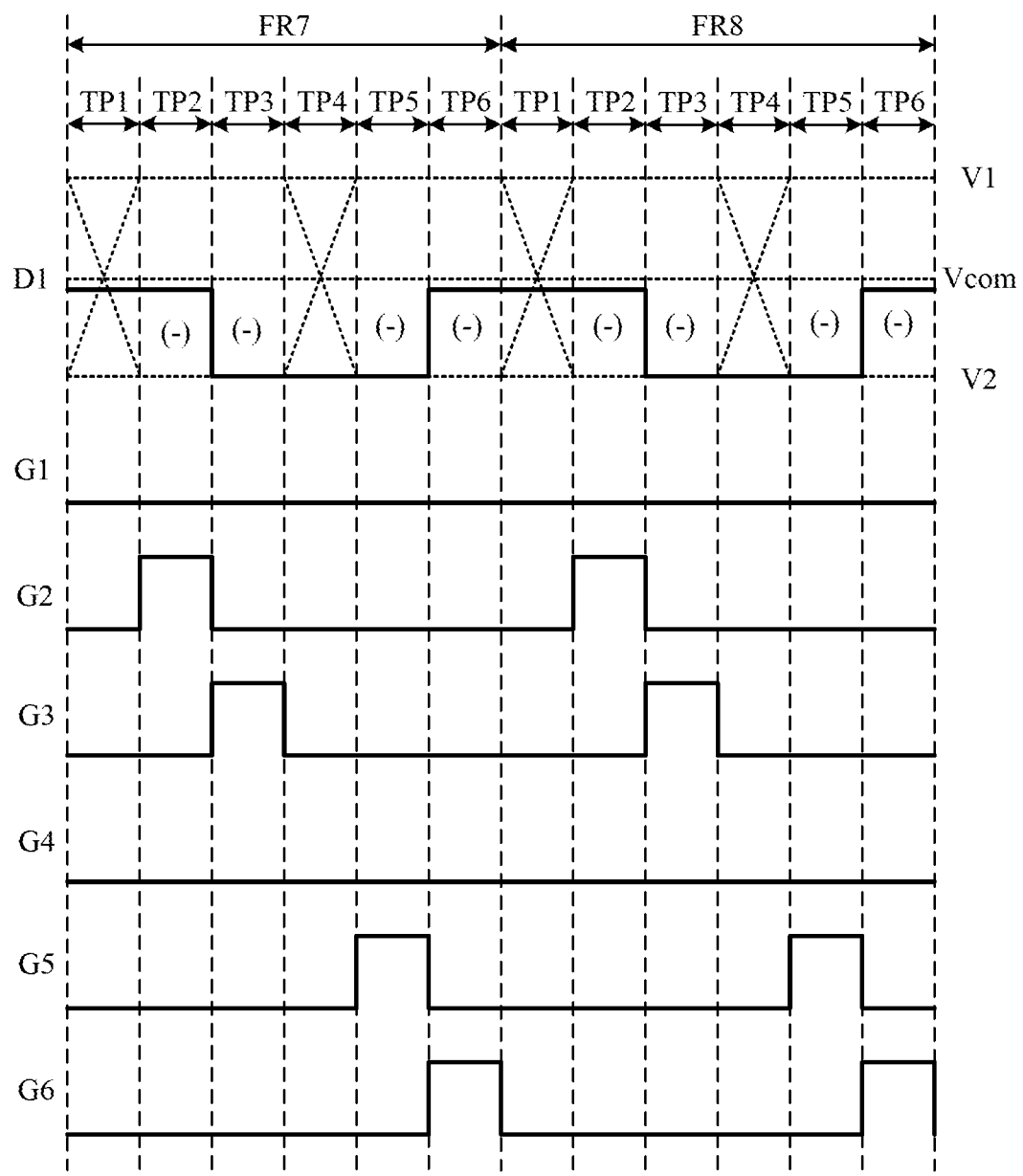

As shown in FIG. 5 and FIG. 7D, in the display frame FR7 (or the display frame FR8), the source driver 120 update the level of the data signal D1 in the time periods T2, T3, T5 and T6 ([M-N] times, [M-N]=4), and the gate driver 140 generate the pulses of the six gate signals G2, G3, G5 and G6.

As shown in FIG. 7D, the level of the data signal D1 is constant at the second voltage level V2 in successive time periods TP3-TP5 in the display frame FR3. Therefore, the level of the data signal D1 will not be toggled at high frequency during the display frames FR3. The source driver will consume less power and induce less heat in generating the data signal D1 during the display frames FR7 (compared to the normal mode as shown in FIG. 7A or FIG. 7C).

In aforesaid embodiments, the pattern of display data is utilized as a condition to decide whether to drive the display panel 100 in the normal toggling mode or the low toggling mode. However, the disclosure is not limited thereto.

Figure 8:
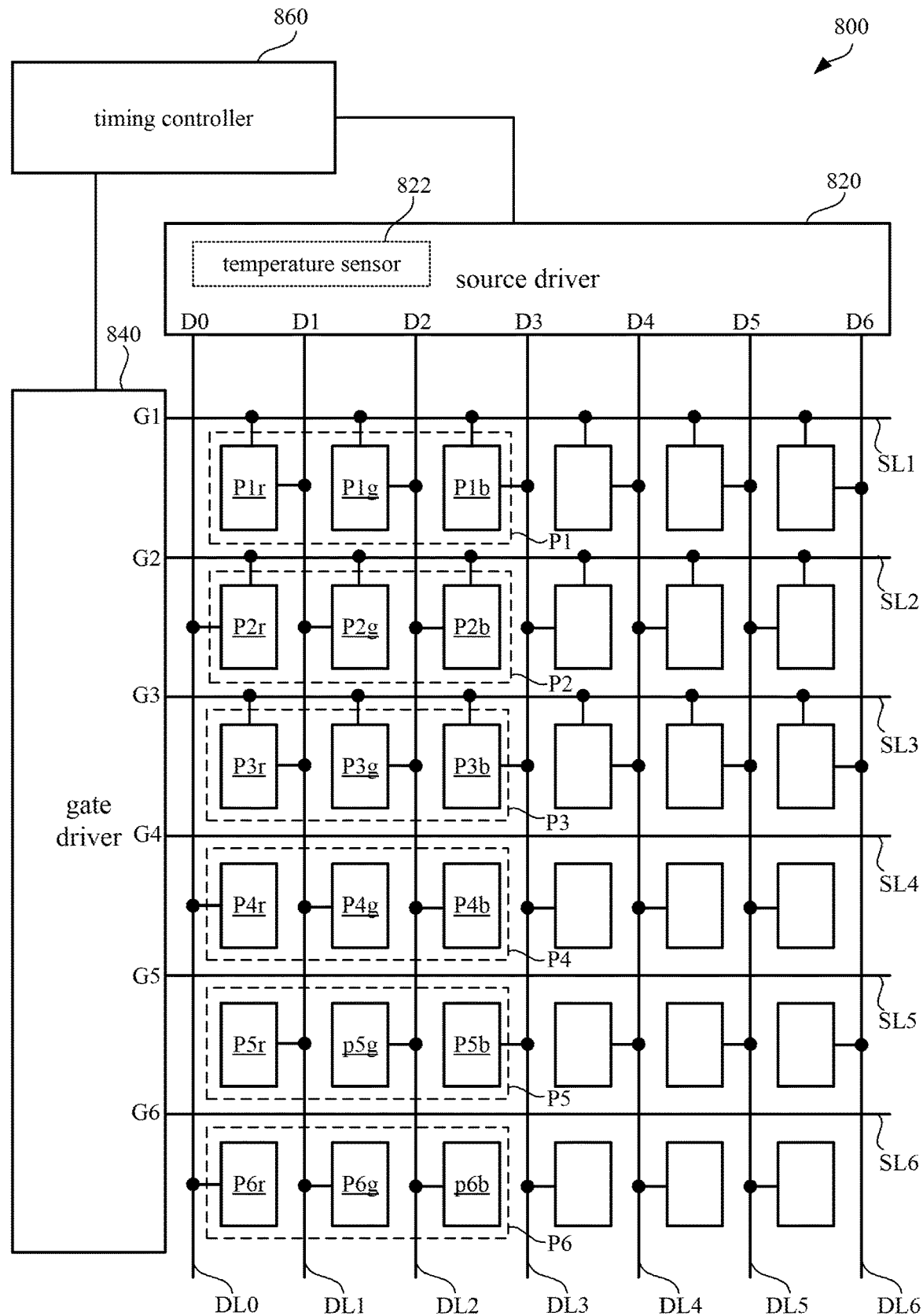
FIG. 8 is a schematic diagram illustrating a display panel according to an embodiment of this disclosure.

In some embodiments, the display panel and corresponding control method may use a temperature reading sensed on the source driver to decide whether to drive the display panel in the normal toggling mode or the low toggling mode. Reference is further made to FIG. 8, which is a schematic diagram illustrating a display panel 800 according to an embodiment of this disclosure. The display panel 800 includes multiple pixels arranged in an array, a source driver 820, a gate circuit 840 and a timing controller (TCON) 860.

In the embodiment shown in FIG. 8, the source driver 820 include a temperature sensor 822, which is configured to sense a temperature reading when the source driver 820 is operated to generate the data signal D0-D6.

Figure 9:
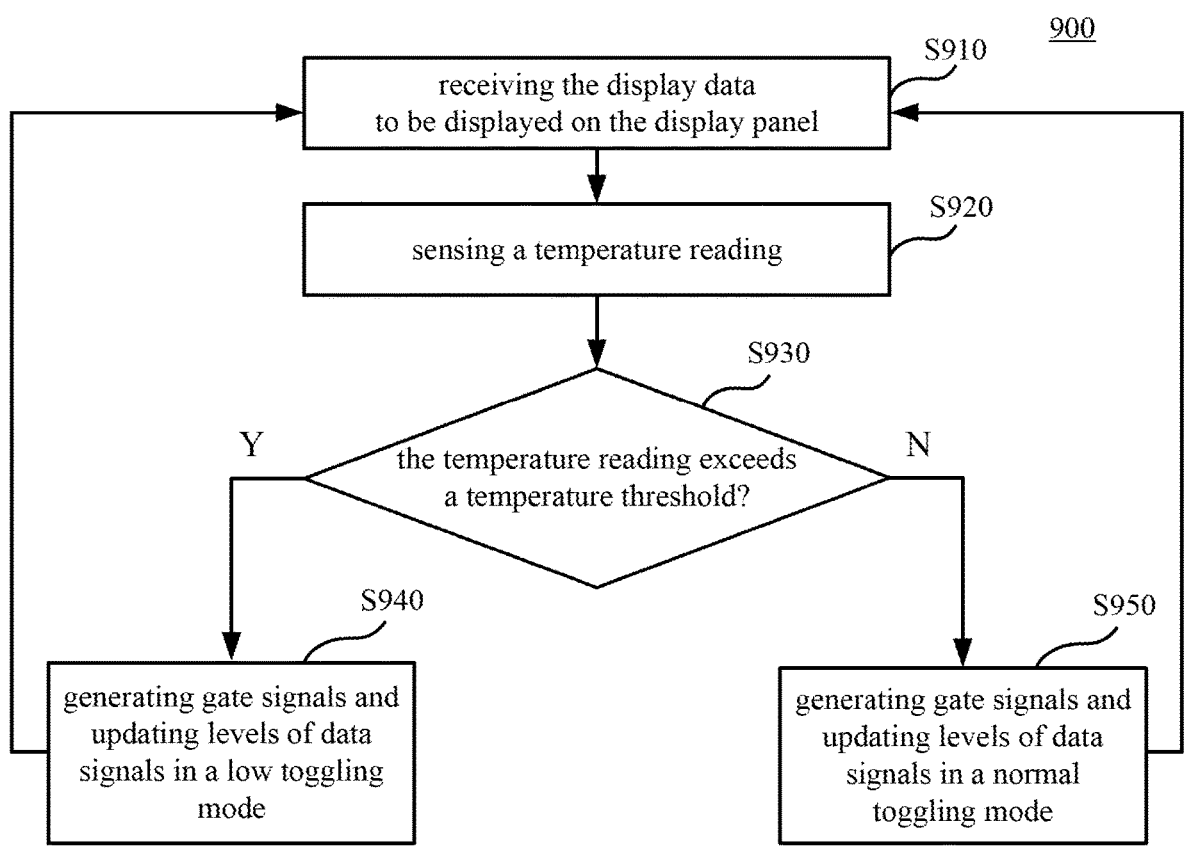
FIG. 9 is a flow diagram illustrating a control method in some embodiments of the disclosure.

Reference is further made to FIG. 9, which is a flow diagram illustrating a control method 900 in some embodiments of the disclosure. As shown in FIG. 9, operation S910 is performed, by the timing controller 860, for receiving the display data to be displayed on the display panel 800. Operation S920 is performed, by the temperature sensor 822, for sensing a temperature reading about a current temperature of the source driver 820. Operation S930 is performed, by the timing controller 860, for determining whether the temperature reading exceed a temperature threshold or not. In some embodiments, the temperature threshold can be 40, 50 or 70 degree Celsius. When the temperature reading sensed from the source driver 820 exceeds the temperature threshold, the source driver 820 may be unstable.

As shown in FIG. 9, when the temperature reading sensed from the source driver 820 exceeds the temperature threshold, operation S940 is performed to generate the gate signals G1-G6 and updating levels of the data signals D0-D6 in a low toggling mode. Details about how to generate the gate signals G1-G6 and updating levels of the data signals D0-D6 in the low toggling mode can be referred to aforesaid embodiments shown in FIG. 5, FIGS. 6A-6D and FIGS. 7A-7D, and not to be repeated here.

On the other hand, when the temperature reading sensed from the source driver 820 is below the temperature threshold, operation S950 is performed to generate the gate signals G1-G6 and updating levels of the data signals D0-D6 in a normal toggling mode.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for a display panel comprising M scan lines and a plurality of source lines, the control method comprising:
   generating M gate signals sequentially in M time periods during a first display frame to the M scan lines of the display panel, and updating a level of a data signal to one of the source lines in the M time periods during the first display frame, M is a positive integer;
   generating N gate signals in N time periods selected from the M time periods during a second display frame to N scan lines selected from the M scan lines, suspending (M-N) gate signals selected from the M gate signals in (M-N) time periods during the second display frame, N is a positive integer smaller than M; and
   updating the level of the data signal in the N time periods during the second display frame, and keeping the level of the data signal as a latest updated level or a high impedance state in the (M-N) time periods during the second display frame; and
   generating the M gate signals sequentially in M time periods during a third display frame to the M scan lines of the display panel, and updating the level of the data signal in the M time periods during the third display frame; and
   generating (M-N) gate signals in (M-N) time periods during a fourth display frame to (M-N) scan lines selected from the M scan lines, and updating the level of the data signal in the (M-N) time periods during the fourth display frame.

2. The control method of claim 1, wherein the level of the data signal is constant in at least two successive time periods during the second display frame.

3. The control method of claim 1, wherein, during the fourth display frame, the control method further comprises:
   suspending the N gate signals selected from the M gate signals in N time periods during the fourth display frame; and
   keeping the level of the data signal as a latest updated level or a high impedance state in the N time periods during the fourth display frame.

4. The control method of claim 3, wherein the level of the data signal is constant in at least two successive time periods during the second display frame and the fourth display frame.

5. The control method of claim 3, wherein the level of the data signal is toggled between different levels during the first display frame and the third display frame.

6. A control method, suitable for a display panel comprising M scan lines and a plurality of source lines, the control method comprising:
   detecting a pattern of display data to be displayed on the display panel;
   determining whether to drive the display panel in a normal toggling mode or a low toggling mode according to the pattern of the display data;
   in response to the normal toggling mode, generating M gate signals sequentially in M time periods during all display frames to the M scan lines of the display panel, and updating a level of a data signal to one of the source lines in the M time periods during all of the display frames, M is a positive integer;
   in response to the low toggling mode, generating M gate signals sequentially in M time periods during a first display frame to the M scan lines of the display panel, and updating a level of a data signal to one of the source lines in the M time periods during the first display frame, M is a positive integer;
   in response to the low toggling mode, generating N gate signals in N time periods during a second display frame to N scan lines selected from the M scan lines, and updating the level of the data signal in the N time periods during the second display frame, suspending (M-N) gate signals selected from the M gate signals in KM-N) time periods during the second display frame, updating the level of the data signal in the N time periods during the second display frame, and keeping the level of the data signal as a latest updated level or a high impedance state in the (M-N) time periods during the second display frame, N is a positive integer smaller than M, N is a positive integer smaller than M;
   in response to the low toggling mode, generating the M gate signals sequentially in M time periods during a third display frame to the M scan lines of the display panel, and updating the level of the data signal in the M time periods during the third display frame; and
   in response to the low toggling mode, generating (M-N) gate signals in (M-N) time periods during a fourth display frame to (M-N) scan lines selected from the M scan lines, and updating the level of the data signal in the (M-N) time periods during the fourth display frame.

7. The control method of claim 6, wherein in the low toggling mode, the level of the data signal is constant in at least two successive time periods during the second display frame.

8. The control method of claim 6, wherein, during the fourth display frame, the control method further comprises:
   suspending the N gate signals selected from the M gate signals in N time periods during the fourth display frame; and
   keeping the level of the data signal as a latest updated level or a high impedance state in the N time periods during the fourth display frame.

9. The control method of claim 6, wherein the level of the data signal is constant in at least two successive time periods during the second display frame and the fourth display frame, and the level of the data signal is toggled between different levels during the first display frame and the third display frame.

10. The control method of claim 6, wherein step of determining whether to drive the display panel in the normal toggling mode or the low toggling mode comprises:
    in response to that the pattern of the display data is detected to be a heavy loading pattern, driving the display panel in the low toggling mode; and
    in response to that the pattern of the display data is not the heavy loading pattern, driving the display panel in the normal toggling mode.

11. The control method of claim 10, wherein the display data detected to be the heavy loading pattern comprises a horizontal stripe screen, a vertical stripe screen or a static screen.

12. A control method, suitable for a display panel comprising M scan lines and a plurality of source lines, the control method comprising:
    sensing a temperature reading around the display panel;
    determining whether to drive the display panel in a normal toggling mode or a low toggling mode according to the temperature reading in reference with a temperature threshold;
    in response to the normal toggling mode, generating M gate signals sequentially in M time periods during all display frames to the M scan lines of the display panel, and updating a level of a data signal to one of the source lines in the M time periods during all of the display frames, M is a positive integer;
    in response to the low toggling mode, generating M gate signals sequentially in M time periods during a first display frame to the M scan lines of the display panel, and updating a level of a data signal to one of the source lines in the M time periods during the first display frame, M is a positive integer;
    in response to the low toggling mode, generating N gate signals in N time periods during a second display frame to N scan lines selected from the M scan lines, and updating the level of the data signal in the N time periods during the second display frame, suspending (M-N) gate signals selected from the M gate signals in KM-N) time periods during the second display frame, updating the level of the data signal in the N time periods during the second display frame, and keeping the level of the data signal as a latest updated level or a high impedance state in the (M-N) time periods during the second display frame, N is a positive integer smaller than M, N is a positive integer smaller than M;
    in response to the low toggling mode, generating the M gate signals sequentially in M time periods during a third display frame to the M scan lines of the display panel, and updating the level of the data signal in the M time periods during the third display frame; and
    in response to the low toggling mode, generating (M-N) gate signals in (M-N) time periods during a fourth display frame to (M-N) scan lines selected from the M scan lines, and updating the level of the data signal in the (M-N) time periods during the fourth display frame.

13. The control method of claim 12, wherein step of determining whether to drive the display panel in the normal toggling mode or the low toggling mode comprises:
    in response to that the temperature reading exceeds the temperature threshold, driving the display panel in the low toggling mode; and
    in response to that the temperature reading is lower than the temperature threshold, driving the display panel in the normal toggling mode.

14. The control method of claim 12, wherein, during the fourth display frame, the control method further comprises:
    suspending the N gate signals selected from the M gate signals in N time periods during the fourth display frame; and keeping the level of the data signal as a latest updated level or a high impedance state in the N time periods during the fourth display frame.

15. The control method of claim 14, wherein the level of the data signal is constant in at least two successive time periods during the second display frame and the fourth display frame, and the level of the data signal is toggled between different levels during the first display frame and the third display frame.

\* \* \* \* \*